United States Patent [19]

Houghton et al.

[11] 3,770,162

[45] Nov. 6, 1973

[54] CARD FEEDING APPARATUS

[75] Inventors: Frank A. Houghton, Detroit; Leonard Wasielewski, Garden City; James L. Kinner, St. Clair Shores, all of Mich.

[73] Assignee: Burroughs Corporation, Detroit, Mich.

[22] Filed: Apr. 21, 1972

[21] Appl. No.: 246,433

[52] U.S. Cl. .................... 221/13, 221/236, 221/258, 271/44 R

[51] Int. Cl. .................... G07f 11/00

[58] Field of Search .................... 221/236, 258, 268, 221/274, 13; 271/44 R

[56] References Cited

UNITED STATES PATENTS

| | | | |
|---|---|---|---|
| 2,572,121 | 10/1951 | Dosberg | 221/258 X |
| 3,262,418 | 7/1966 | Stephens et al | 221/268 X |
| 3,380,732 | 4/1968 | Simpson | 271/44 R |
| 3,508,680 | 4/1970 | Ewald, Jr. et al. | 221/258 |

OTHER PUBLICATIONS

IBM Technical Disclosure Bulletin 221–236 Hopper Card Joggler M. Fiehl Vol. 4 No. 2 7/1961.

*Primary Examiner*—Samuel F. Coleman
*Attorney*—Paul W. Fish et al.

[57] ABSTRACT

This invention relates to apparatus for picking record documents such as punched cards individually from the bottom of a stack and for feeding the individual records at high speed to a record transport system wherein the records are processed and then ejectably restacked, the structure of the high speed picking and feeding apparatus being economical to build and to maintain, reliable in operation, and predisposed to minimize damage to the trailing edges of the records.

13 Claims, 6 Drawing Figures

CARD FEEDING APPARATUS

CROSS REFERENCES TO RELATED APPLICATIONS

The present invention is related to the Record Card Reader, Feeder and Transport Device disclosed by Frank A. Houghton and Thomas N. Yesowich in U. S. Pat. No. 3,680,853 issued Aug. 1, 1972, such patent having been assigned to the assignee of the present application. The invention herein disclosed represents an alternate and improved means, from that disclosed by Houghton and Yesowich, for picking cards from the bottom of a stack and for feeding the picked cards to the record transport system, the latter system being defined by Houghton and Yesowich as comprising a "read ready station," a "read station," a "stacker ready station," and a "stacker."

Related also to the present invention is the application of Leonard Wasielewski and James L. Kinner disclosing and claiming a Solenoid Control System, the latter application, Ser. No. 246,272 filed on Apr. 21, 1972, also having been assigned to the assignee of the present application.

BACKGROUND OF THE INVENTION

In recognition of the importance of input and output peripherals to the overall throughput of present data processing computer systems, attention is increasingly being directed to the overall reliability and speed of operation of such peripherals as card readers, card punches, and line printers. Of particular concern in the acceleration of computer throughput is the speed and reliability of input devices such as card readers. Consistent with this attention to improved speed and reliability in record card readers, many different approaches have been developed for picking the bottom card in the stack and for advancing the picked card to an initial stage of the card transport system. These approaches include a variety of concepts for activating the pickers in either a translatory or arcuate fashion as motivated by one-revolution clutches, cams and cam followers, or cumbersome rotary drive devices. These known concepts have generally proven to be expensive to manufacture or ineffective from the standpoint of long range reliability.

Cam driven pickers, as an example, have generally been characterized by their slowness in operation and their proclivity for causing card jams at the feeder injection throat. Rotary type devices, on the other hand, have been characterized by their complexity of structure which generally renders them too expensive to build.

SUMMARY OF THE INVENTION

It is accordingly an object of the present invention to provide an improved high speed document or card picking device for use in connection with a document transport system such as a card reader or the like, the improvement providing reliable, high speed picking of cards without damaging the trailing edges thereof.

It is another object of the invention to provide an improved card picking device that is both reliable in operation and economical to build and to maintain, the structure thereof being of relatively simple design and comprised of a minimum number of operating parts.

It is still another object of the present invention to provide an improved card picking device wherein the pickers are controllably deactivated in substantial synchronization with the arrival of a card at the feed station, to thereby prolong the life of the picker activating means and to minimize the occurrence of jams resulting from card bounce at the feed station.

It is yet another object of the invention to provide an improved card picker that effectively supports the weight of the cards in a stack of cards as the bottom card thereof is picked and advanced to the feed station, such support permitting optimized card picking and advancement without interference from the weight applied by the remaining cards in the stack upon the card being picked.

An important aspect of the invention is the use of a pair of arcuately movable picker knives mounted for one degree of freedom on a pair of shaft supported levers or arms, the shaft being rotatable at high speed to thereby pick the bottom card in the stack and to advance the picked card to the feed station.

Another important aspect of the invention is the use of a torque arm fixed to the rotatable shaft, the torque arm being actuatable through a predetermined stroke by a solenoid, the predetermined stroke of the torque arm being transmitted to the levers and picker knives in terms of a predetermined arcuate stroke sufficient for picking the bottom card and advancing said card to a feed station.

Another important aspect of the invention is the use of an adjustable resilient stop member and a compression spring in association with the torque arm and solenoid, the compression spring serving to define the home positions of the shaft, the levers, and the picker knives and to return the levers and picker knives thereto upon deenergization of the solenoid, and the resilient stop member serving to minimize the length of the stroke required to advance the bottom card to the feed station.

Still another aspect of the invention is the use of a photo-sensor in association with the shaft and torque arm, the effect thereof being to control the intervals of solenoid energization according to the number and weight of the cards in the stack, such control serving to prolong the life of the solenoid and to minimize the likelihood of card jams resulting from bounce at the feed station.

BRIEF DESCRIPTION OF THE DRAWING

These and other objects, advantages and aspects of the invention will be more clearly understood from the following description when read in conjunction with the accompanying drawing, in which.

DETAILED DESCRIPTION OF THE INVENTION

Figure 1:
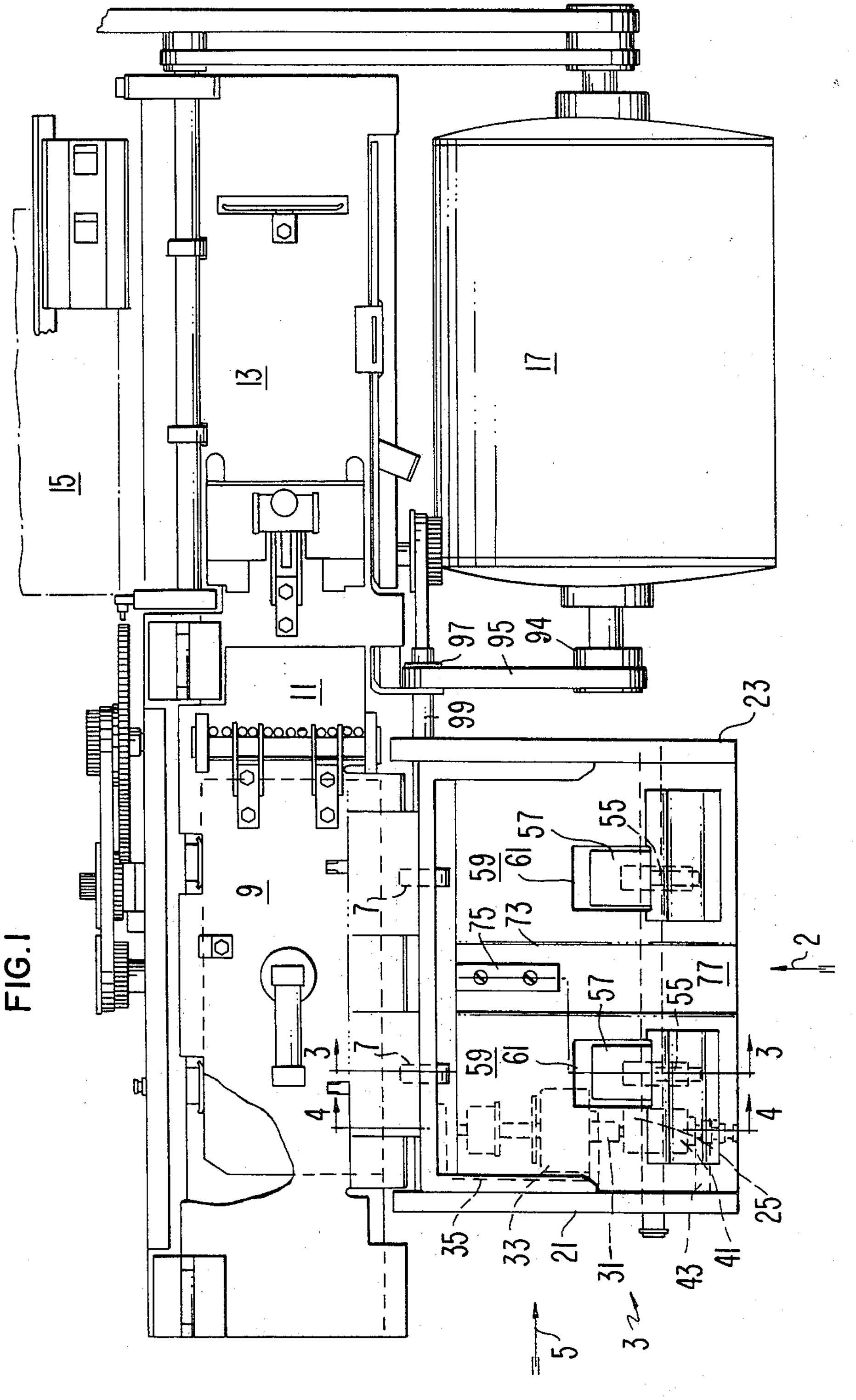
FIG. 1 is a plan view of the inventive card picker shown in association with the feed rollers of the "read ready station" of the Record Card Reader, Feeder and Transport Device disclosed by Houghton and Yesowich in their above-referenced U.S. patent.
Figure 3:
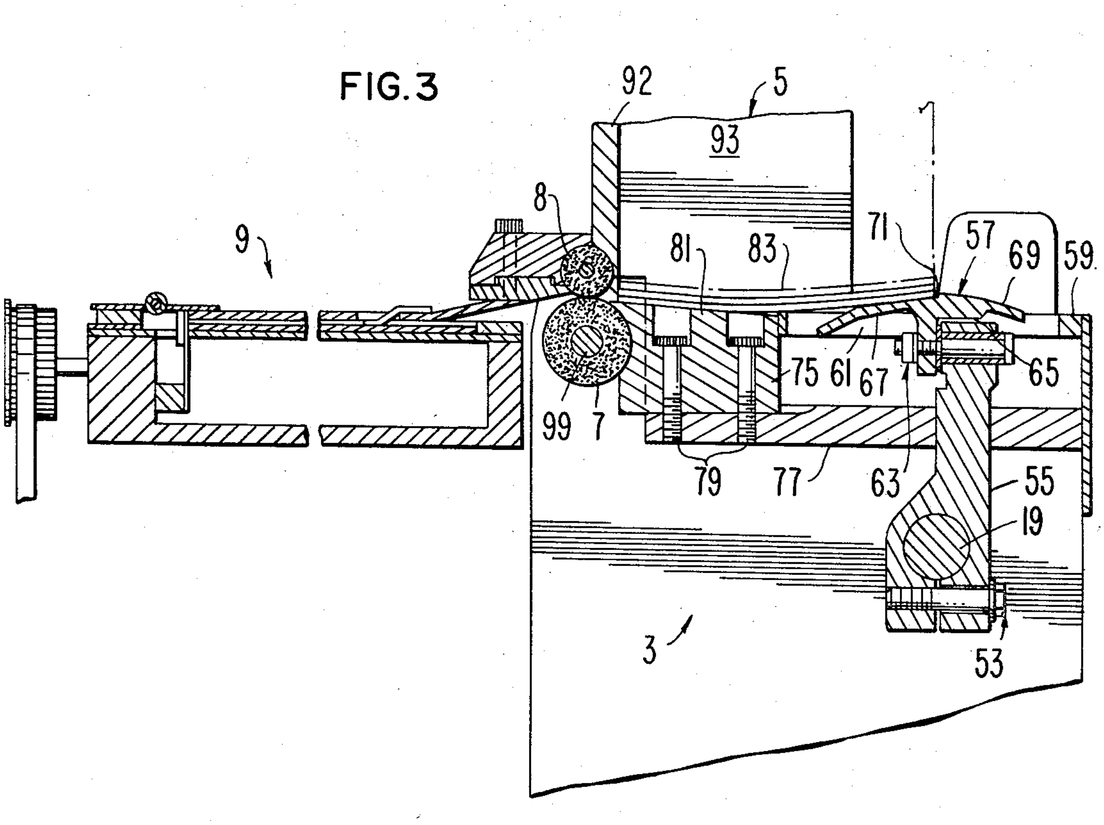
FIG. 3 is a side elevation of the invention taken substantially along the line 3—3 of FIG. 1.

The preferred embodiment of the invention, as generally designated at 3 in FIG. 1, is effective for picking the bottom card in a stack of cards disposed within a card hopper 5 (FIGS. 3 and 5), and for advancing the bottom card to a pair of driven pressure rollers 7 which cooperate with a pair of idler rollers 8 to advance the picked card to a "read ready" station 9, as best illustrated in FIG. 3. Following the picking and advancement of the bottom card to the "read ready" station 9, the card is thereupon successively advanced to a "read" station 11, a "stacker ready" station 13 and to a "stacker" 15, as illustrated in FIG. 1. These various movements of a card following its being picked from the bottom of the stack, as described by Houghton and Yesowich in the above referenced patent, are accomplished by a series of driven pressure rollers which are activated by an electric motor 17 shown in FIG. 1.

Figure 4:
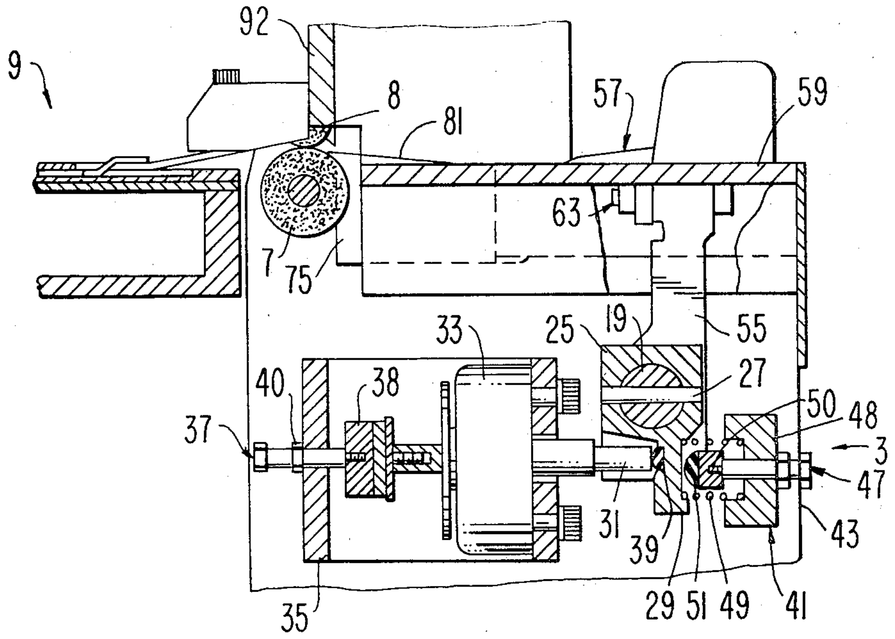
FIG. 4 is a sectional elevation of the invention taken substantially along the line 4—4 of FIG. 1 and showing various of the detailed parts of the preferred embodiment.

The preferred embodiment of the improved card picking and feeding apparatus can best be described with reference to FIGS. 2, 3 and 4 wherein a rotatable shaft 19 is journaled within a pair of frame members 21 and 23. A torque arm 25 best shown in FIG. 4 is fixed to the shaft 19 by any suitable means such as by a pin 27. The torque arm 25 is provided with a downwardly directed projection 29 disposed in cooperating relationship with an extending armature 31 of a solenoid 33. The solenoid 33 is supported by a bracket 35 (FIGS. 1 and 4) connected to the frame members 21 and 23. The solenoid 33 is also provided with lateral adjustment means generally indicated at 37 (FIG. 4) consisting of a positioner 38 and a lock-nut arrangement 40. The impactable contact of the extending armature 31 of the solenoid 33 with the torque arm 25 is cushioned by means of a rubber bumper 39 fixed to the end of the armature 31.

Disposed on the opposite side of the downwardly directed projection 29 from the extending armature 31 is a resilient stop generally designated at 41, such stop being supported by a bracket 43 (best shown in FIG. 2) which is connected to the left frame member 21 by any suitable means. The resilient stop 41, as best illustrated in FIG. 4, is comprised of a U-shaped member 48 partially housing a compression spring 49, and a bumper 50 fixed to lateral adjustment means generally designated at 47. The arrangement of the stop and spring is such that the outboard extremity of the compression spring 49 is retained within a recess formed in the downwardly directed projection 29 of the torque arm 25. A rubber cushion 51 fixed to the exterior surface of the bumper 50 serves to dampen the shock caused by the impactable contact of the projection 29 against the bumper 50 when driven by the solenoid 33. This impact of the projection 29 against the bumper 50 is preceded by a predetermined contraction of the compression spring 49 to thereby load the spring for the return activation of the torque arm 25 and the shaft 19 upon deenergization of the solenoid 33.

Secured to the shaft 19 by means of a bolt and clamp arrangement, generally designated at 53 in FIG. 3, are a pair of spaced-apart mounting arms or levers 55. Each of these mounting arms serves to support a picker knife 57 that is pivotally connected to the upper extremity thereof with one degree of freedom. The spaced apart arrangement of the mounting arms 55 on the shaft 19 serves to provide each of the picker knives 57 with secure purchasing contact with the trailing edge of a card disposed in the bottom of the hopper 5, such contact being interiorly contiguous to the side edges of the card. A base plate 59, forming a bottom support for the card hopper 5, is provided with a pair of cutouts 61 (FIGS.1 and 3) for accommodating the picker knives 57 during their advanceable and return activation. The mounting of the picker knives 57 on the mounting arms 55, to provide the picker knives with one degree of freedom thereon, is accomplished by means of a pivotal bolt arrangement generally designated at 63 in FIG. 3, the picker knives being rotatable a predetermined distance on their respective bolts as defined by a space 65 between the undersides of the picker knives and the uppermost extremities of the mounting arms 55. Each of the picker knives 57 is comprised of an arcuately formed anterior webbed portion 67 and an arcuately formed posterior webbed portion 69, the upper surfaces of these webbed portions being separated by a vertical ledge 71 that serves as an abutting surface for contactably picking the trailing edge of the bottom card in the stack and for advancing the picked card to the pressure rollers 7 and 8 during the counterclockwise rotation of the shaft 19 and the mounting arms 55 (as viewed in FIG. 3).

Figure 2:
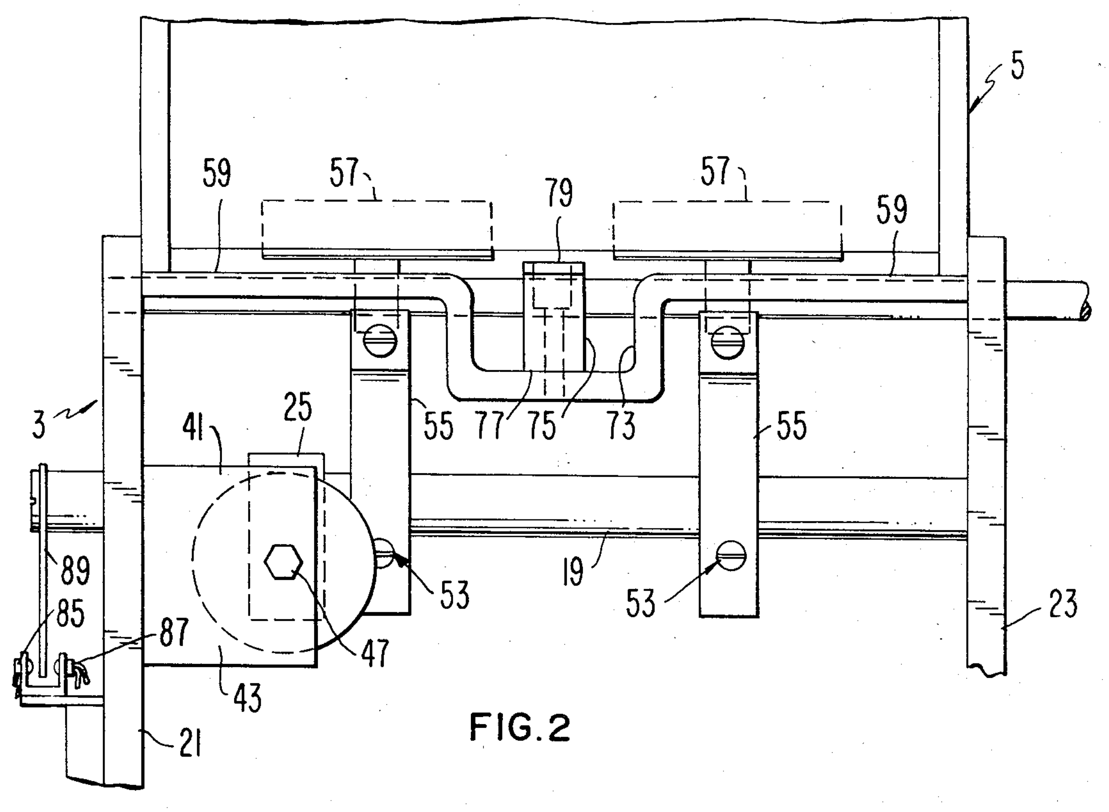
FIG. 2 is a sectional elevation of the invention taken in the direction of the arrow 2 of FIG. 1.

It is to be noted that the base plate 59, in addition to the cutouts 61 accommodating the picker knives 57, is also provided with a depressed portion 73 (as best shown in FIG. 2) to accommodate a stack support member 75 centrally disposed relative to the card hopper 5 and intermediate the feed rollers 7 and 8. This stack support member 75 is fixed to a bottom surface 77 of the depressed portion 73 by means of a pair of screws 79. The uppermost surface of the stack support member 75 is provided with an inclined surface 81 (as best shown in FIG. 3), such inclined surface extending upwardly from the plane of the base plate 59 to effectively support the leading edges of the cards stacked in the card hopper 5. It can thus be seen, as depicted in FIG. 3, that the leading edges of the cards 83 in the hopper 5 are supported by the inclined surface 81 of the support member 75, and that the trailing edges of the cards are supported by the arcuately formed anterior webbed portions 67 of the picker knives 57. It can also be seen that the one degree of freedom provided the picker knives 57 will serve to assure effective alignment of the vertical ledges 71 of the picker knives 57 with the trailing edge of the bottom card, even though the trailing edge may be warped or otherwise convexly or concavely formed.

It is also to be noted that the arcuately formed posterior webbed portions 69 of the picker knives 57 will serve to support the weight of the cards 83 as applied at the trailing edges thereof as the bottom card in the stack is picked and advanced to the feed rollers 7 and 8, thereby providing free advancement of the bottom card without interference imposed by the weight of the remaining cards in the stack. It is also apparent that the inclined surface 81 of the stack support member 75 will serve to guide the leading edge of the bottom card to a position of ready ingress to the feed rollers 7 and 8 as the bottom card is advanced by the picker knives 57.

The preferred embodiment of the present Card Feeding Apparatus is also provided with a solenoid control system which is disclosed in detail and claimed in the above referenced patent application by Leonard Wasielewski and James L. Kinner titled Solenoid Control System and assigned Ser. No. 246,272. The purpose of this solenoid control device is to variably control the interval of energizing the solenoid 33 during card picking operations, according to the number and weight of the cards in the hopper 5. It will be apparent from the above description of the function of the posterior webbed portions 69 of the picker knives 57 in supporting the weight of the cards in the hopper as the bottom card is picked, that a variable drag will be imposed upon the picker knives depending upon the number of cards in the hopper, greater drag being imposed when the hopper is full and lesser drag when the hopper contains but a few cards. The effect of this variable drag on the picker knives, in the absence of any control device for varying the interval of solenoid energization, would be an excessive thrust of the picked cards when the hopper contains but a few cards, and possible insufficient thrust when the hopper is full, the former condition tending to result in card bounce and possible jams at the feed station, and the latter condition tending to result in failure to feed a card upon demand. In addition to improved reliability in card picking and feeding, the solenoid control system disclosed and claimed in the Wasielewski and Kinner application and utilized in the present embodiment of a card feeding apparatus, serves to prolong the life of the picker-knife-driving-solenoid 33, inasmuch as the solenoid in each card-picking cycle would be energized for only that interval of time required to pick and to advance the card to the feed rollers, such interval being time-independent according to the interval of time required under varying circumstances to advance the picked card a predetermined distance to the feed rollers 7 and 8.

Figure 5:
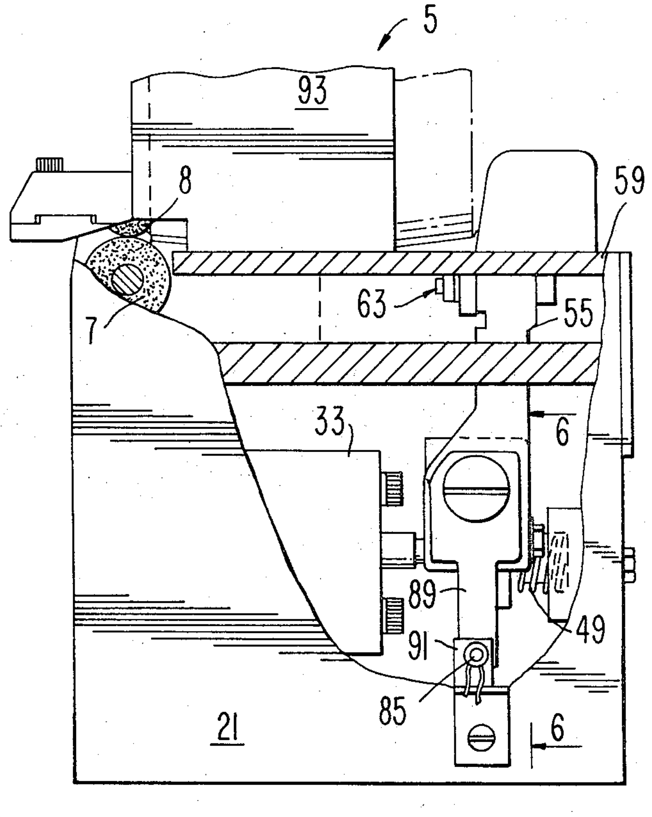
FIG. 5 is a side view taken in the direction of the arrow 5 of FIG. 1 with the frame member partially cutaway to expose the solenoid and the compression spring of the resilient stop member, a beam interrupter being shown fixed to the end of the shaft providing support for the torque arm and the pair of levers.
Figure 6:
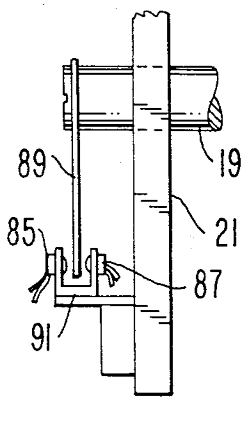
FIG. 6 is a fragmentary view taken along the line 6—6 of FIG. 5 and showing the photo-sensor in association with the beam interrupter fixed to the extremity of the rotatable shaft.

The solenoid control device utilized in the present embodiment comprises a photo-sensor such as a light emitter and light sensor representatively illustrated at 85 and 87 in FIG. 6, a beam interrupter 89 fixed to the leftmost extremity of the shaft 19 as illustrated in FIG. 5, and circuitry means disclosed and claimed in the above-referenced Wasielewski and Kinner application. The photo-sensor 85–87 is supported by a two-pronged bracket 91 fixed to the frame member 21, and the disposition of the beam interrupter 89 on the shaft 19 is such that its lower extremity is interposed between the light emitter and the light sensor when the shaft 19, the torque arm 25, the mounting arms 55 and the picker knives 57 are located in their respective home positions. As disclosed in the above-referenced Wasielewski and Kinner application the circuitry of their Solenoid Control System is such that the solenoid 33 may be energized only when the light emitted from the emitter is blocked from the light sensor by the presence of the beam interrupter 89 therebetween, such blockage of light continuing in all instances until the picker knives have advanced a predetermined distance in the direction of the feed rollers 7 and 8, the time interval required for such predetermined advancement varying according to the drag imposed by the weight of the cards in the hopper 5 upon the posterior webbed portions 69 of the picker knives 57. It follows, therefore, that the energization of the solenoid 33 will be terminated at that instant in the advanceable activation of the picker knives 57 when the beam interrupter 89 assumes a non-blocking relationship relative to the light emitter 85 and light sensor 87 to thereby permit the passage of light therebetween. Since according to the circuitry of the Wasielewski and Kinner solenoid control system the passage of light between the emitter 85 and the sensor 87 will serve to deenergize the solenoid 33, the beam interrupter 89 should be so adjusted as to permit such passage of light at precisely that point in the advanceable activation of the picker knives 57 when the leading edge of the picked card falls under the control of the feed rollers 7 and 8.

OPERATION

Operation of the preferred embodiment of the present card feeding apparatus, in conjunction with a record transport system such as that disclosed by Houghton and Yesowich in U.S. Pat. No. 3,680,853, requires the placement of a quantity of record documents such as punched cards in the card hopper 5 so that the leading edges of the cards are disposed in abutting relationship with the leading edge support 92 (FIGS. 3 and 4) of the hopper, with the side edges of the cards disposed in contiguous relationship with the side supports 93 (FIGS. 3 and 5). With the cards so placed, the weight of the cards in the hopper is substantially supported by the inclined surface 81 of the support member 75 and by the arcuately formed anterior webbed portions 67 of the picker knives 57, the trailing edge of the bottom card being located in contactable relationship relative to the vertical ledges 71 of the pair of picker knives 57. After placing the cards in the hopper 5, the operator of the equipment would then turn on the constant running motor 17 by any suitable means such as a motor switch, whereupon the driven pressure rollers 7 and idler rollers 8 would commence to rotate as driven by a motor pulley 94, a belt 95, a driven pulley 97, and a driven shaft 99 to which the pressure rollers 7 are fixed. The pressure rollers 7 are drivenly rotated in a counterclockwise direction (as viewed in FIG. 3), and the idler rollers 8 are frictionally rotated in a clockwise direction, the two sets of rollers being thereby activated to receive the leading edges of cards as they are picked by the picker knives 57 and to feedably transport the picked cards to the "read ready station" 9. Upon energization of the solenoid 33 by means of a card feed command received from the computer, or by means of a pulse signal received from any suitable control device with which the record transport system is cooperably used, the armature 31 ejectably contacts the downwardly directed projection 29 of the torque arm 25 and thereby transmits counterclockwise motion to the torque arm 25 and to the rotatable shaft 19 (as viewed in FIG. 4). Counterclockwise rotation of the shaft 19 serves to transmit a corresponding counterclockwise motion to the pair of mounting arms 55 and to the picker knives 57 pivotally mounted thereon. The trailing edge of the bottom card in the hopper 5 is accordingly contacted by the vertical ledges 71 of the picker knives 57 to thereby advance the bottom card to the rotating feed rollers 7 and 8. During this feedable advancement of the bottom card, as motivated by the picker knives 57, the weight of the cards in the hopper is dynamically supported by the arcuately formed posterior webbed portions 69 (FIG. 3) of the picker knives, the compression spring 49 (FIG. 4) is compressibly loaded by the downwardly directed projection 29, and the beam interrupter 89 (FIG. 5) is withdrawably rotated in a counterclockwise direction relative to the light emitter 85 and light sensor 87. At that point in the feedable advancement of the picker knives 57 as the beam interrupter 89 is fully withdrawn from its blocking relationship relative to the light emitter 85 and light sensor 87, the passage of light between said latter elements is effective to deenergize the solenoid 33. Upon deenergization of the solenoid 33, the loaded compression spring 49, acting upon the downwardly directed projection 29 of the torque arm 25, serves to return the torque arm 25, the shaft 19, the pair of mounting arms 55 and the picker knives 57 to their home positions, the return of the picker knives 57 serving to contactably align the vertical ledges 71 thereof with the trailing edge of the next succeeding card in the hopper preparatory to picking and feeding this new bottom card when the solenoid 33 is again energized.

While the invention has been shown and described in considerable detail, it will be understood that many variations thereof may be had without departing from the true spirit and scope of the invention.

What is claimed is:

1. In a record card transport system having a card hopper, at least a pair of driven feed rollers, and a processing station wherein data is read from or recorded on said cards, an improved card picking and feeding device effective for picking the bottom card in said hopper and for advancing said picked card to said feed rollers, said device comprising:

a. a rotatably mounted shaft disposed in parallel relationship relative to the trailing edges of the cards in said hopper, b. card picking and advancing means associated with said rotatable shaft, said means being effective for dynamically supporting the weight of the cards in the hopper during the advancement of the bottom card, c. means for activating said picking and advancing means, and d. control means associated with said shaft, said picking and advancing means, and said activating means and effective for varying the interval of activation of said activating means in direct relationship to the weight applied by the cards in the hopper upon said picking and advancing means, said control means including a light emitting member, a light sensing member, and a beam interrupter, the activation of said activating means requiring the blocking of light from said emitting member to said sensing member by said beam interrupter, the passage of light therebetween, as enabled by the rotatable withdrawal of said beam interrupter, serving to deactivate said activating means, the effect of said control means on said activating means being to assure the advancement of the bottom card in the hopper to said driven feed rollers and to reduce the tendency of card jams in the area of said feed rollers caused by the bouncing of said bottom card thereagainst.

2. The improved card picking and feeding device defined in claim 1 and additionally comprising resilient stop means associated with said shaft and said card picking and advancing means, said resilient means being effective to limit the advanceable activation of said card picking and advancing means as motivated by said activating means, and effective also for returnably activating said shaft and said card picking and advancing means following the deactivation of said activating means.

3. The improved card picking and feeding device defined in claim 2 wherein said card picking and advancing means comprises:

a. a torque arm fixed to said rotatable shaft, and b. at least one pivotally mounted picker knife coupled to said rotatable shaft, said pivotable mounting of said picker knife providing contactable alignment thereof with the trailing edge of said bottom card despite the possible warped formation thereof, and said coupling of said picker knife to said rotatable shaft providing advanceable cooperation between said picker knife and said trailing edge of said bottom card to thereby pick and to advance said card to said driven feed rollers.

4. The improved card picking and feed device defined in claim 3 wherein said resilient stop means comprises a resilient stop member and an associated compression spring, said stop member cooperating with said torque arm to limit the advanceable activation of said card picking and advancing means as motivated by said activating means and said compression spring cooperating with said torque arm to returnably activate said shaft and said card picking and advancing means following said deactivation of said activating means.

5. The improved card picking and feeding device defined in claim 4 wherein said coupling of said picker knife to said rotatable shaft is effectuated by means of a lever fixed to said shaft in cooperating relationship with the trailing edge of said bottom card.

6. The improved card picking and feeding device defined in claim 5 wherein said pivotal mounting of said picker knife is effectuated by means of a bolt carried at the upper extremity of said lever fixed to said shaft, said bolt retainably providing said picker knife with one degree of freedom in a plane parallel to the trailing edge of said bottom card in said hopper.

7. The improved card picking and feeding device defined in claim 6 wherein each of said picker knives is provided with an arcuately formed anterior webbed portion and an arcuately formed posterior webbed portion, said portions being separated by a vertical ledge for contactably picking and advancing said bottom card to said driven feed rollers, said anterior webbed portion serving to support the trailing edges of the cards in the hopper and the weight associated therewith, and said posterior webbed portion serving to support the weight of the remaining cards in the hopper as the bottom card is picked and advanced to said feed rollers.

8. The improved card picking and feeding device defined in claim 4 wherein said means for activating said picking and advancing means comprises a solenoid mounted in cooperating relationship with said torque arm fixed to said rotatable shaft, said solenoid being responsively energized by a predetermined signal to thereby activate said picking and advancing means, and being also responsive to the termination of said predetermined signal to relinquish the control of said torque arm and said shaft to said compression spring of said resilient stop means to thereby enable said returnable activation of said card picking and advancing means.

9. The improved card picking and feeding device defined in claim 8 wherein said light emitting member and said light sensing member are electrically coupled to said solenoid of said activating means, and wherein the energization of said solenoid requires the blocking of light from said emitting member to said sensing member by said beam interrupter and the passage of light therebetween, as enabled by the withdrawal of said beam interrupter, serves to de-energize said solenoid and to thereby enable said compression spring of said resilient stop means to returnably activate said card picking and advancing means.

10. An improved card picking and advancing device for use in conjunction with a card hopper and at least a pair of feed rollers, said device comprising:

a. engaging means effective for contacting the trailing edge of the bottom card in said hopper, said means serving to support the weight of the remaining cards in the hopper during the advancement of said bottom card, b. means for advanceably and returnably activating said engaging means, and c. means cooperating with said advanceable and returnable activating means for controlling and variably limiting said advanceable activation of said engaging means such that said bottom card is precisely advanced to said feed rollers irrespective of the weight imposed by the remaining cards in the hopper on said engaging means, said controlling means including a light emitting member, a light sensing member, and a beam interrupter, the advanceable activation of said engaging means by said activating means requiring the blocking of light from said emitting member to said sensing member by said beam interrupter, the passage of light therebetween, as enabled by the withdrawal of said beam interrupter, serving to deactivate said activating means.

11. The improved card picking and advancing device defined in claim 10 wherein said engaging means comprises:

a. a rotatably mounted shaft disposed in parallel relationship relative to the trailing edge of said bottom card, b. a torque arm fixed to said rotatable shaft, c. a pair of mounting levers fixed to said rotatable shaft in predetermined spaced-apart relationship, and d. a picker knife pivotally mounted on each of said pair of mounting levers for one degree of freedom in a plane defined by the trailing edge of said bottom card, said picker knives by reason of said predetermined spaced-apart relationship of said mounting levers being disposed in cooperating relationship relative to the trailing edge of said bottom card.

12. The improved card picking and advancing device defined in claim 11 wherein said means for advanceably and returnably activating said engaging means comprises:

a. a solenoid disposed in cooperating relationship with said torque arm and responsive to a predetermined signal for advanceably activating said engaging means, and b. a resilient stop member cooperably disposed relative to said torque arm, said member having a cushioned stop for limiting said advanceable activation of said engaging means and a compression spring effective for returnably activating said engaging means upon termination of said predetermined signal.

13. The improved card picking and advancing device defined in claim 12 wherein said light emitting member and said light sensing member are coupled to said solenoid of said activating means, and wherein the energization of said solenoid in response to said predetermined signal requires the blocking of light from said emitting member to said sensing member by said beam interrupter and the passage of light therebetween, as enabled by the withdrawal of said beam interrupter, serves to de-energize said solenoid and to thereby enable said compression spring to returnably activate said engaging means.

* * * * *